(12) United States Patent
Chun

(10) Patent No.: US 11,338,775 B2
(45) Date of Patent: May 24, 2022

(54) APPARATUS AND METHOD FOR CONTROLLING WIPER OF VEHICLE

(71) Applicants: HYUNDAI MOTOR COMPANY, Seoul (KR); KIA MOTORS CORPORATION, Seoul (KR)

(72) Inventor: In Tae Chun, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 483 days.

(21) Appl. No.: 16/393,083

(22) Filed: Apr. 24, 2019

(65) Prior Publication Data

US 2020/0114878 A1 Apr. 16, 2020

(30) Foreign Application Priority Data

Oct. 15, 2018 (KR) ................. 10-2018-0122595

(51) Int. Cl.
*B60S 1/04* (2006.01)
*B60S 1/08* (2006.01)
*B60S 1/38* (2006.01)

(52) U.S. Cl.
CPC .......... *B60S 1/0469* (2013.01); *B60S 1/0452* (2013.01); *B60S 1/0491* (2013.01); *B60S 1/08* (2013.01); *B60S 1/0818* (2013.01); *B60S 1/0862* (2013.01); *B60S 1/38* (2013.01); *B60S 2001/3844* (2013.01)

(58) Field of Classification Search
CPC ........ B60S 1/08; B60S 1/0818; B60S 1/0862; B60S 1/0469; B60S 1/0455; B60S 1/0452; B60S 1/0491; B60S 1/38; B60S 2001/3827; B60S 2001/3836; B60S 2001/3844
USPC ............ 15/250.16, 250.17, 250.361, 250.48; 318/DIG. 2
See application file for complete search history.

(56) References Cited

U.S. PATENT DOCUMENTS

| | | | | |
|---|---|---|---|---|
| 4,904,908 | A * | 2/1990 | Buschur | B60S 1/08 15/250.17 |
| 6,306,220 | B1 * | 10/2001 | Zimmer | B60S 1/08 134/6 |
| 6,654,984 | B2 | 12/2003 | Hoshino | |
| 8,468,643 | B2 | 6/2013 | Kim et al. | |
| 9,340,183 | B2 | 5/2016 | Jehannet et al. | |
| 9,352,724 | B2 * | 5/2016 | Natsume | B60S 1/08 |
| 9,421,950 | B2 | 8/2016 | Bommer et al. | |
| 2001/0032370 | A1 | 10/2001 | Hoshino | |
| 2002/0163318 | A1 * | 11/2002 | Iredale | B60S 1/08 318/483 |

(Continued)

FOREIGN PATENT DOCUMENTS

EP 2241484 A1 10/2010
JP 2001-301581 A 10/2001

(Continued)

*Primary Examiner* — Gary K. Graham
(74) *Attorney, Agent, or Firm* — Slater Matsil, LLP

(57) ABSTRACT

A vehicle wiper control apparatus monitors whether warpage occurs in a wiper strip made of a rubber-elastic material that is provided in a wiper blade. When a wiper of a vehicle is turned off and the warpage occurs in the wiper strip, the control apparatus controls the wiper mechanism to move the wiper blade to a parking position thereby preventing deformation of the wiper strip and maintaining the performance thereof.

20 Claims, 6 Drawing Sheets

(56) References Cited

U.S. PATENT DOCUMENTS

| | | |
|---|---|---|
| 2006/0265830 A1 | 11/2006 | Walworth et al. |
| 2007/0113366 A1 | 5/2007 | Walworth et al. |
| 2009/0049638 A1 | 2/2009 | Jehannet et al. |
| 2010/0293738 A1 | 11/2010 | Kim et al. |
| 2014/0230174 A1 | 8/2014 | Bommer et al. |

FOREIGN PATENT DOCUMENTS

| | | |
|---|---|---|
| JP | 2008-529883 A | 8/2008 |
| KR | 10-2009-0028504 A | 3/2009 |
| KR | 10-1053022 B1 | 8/2011 |
| KR | 10-2014-0079444 A | 6/2014 |

* cited by examiner

APPARATUS AND METHOD FOR CONTROLLING WIPER OF VEHICLE

CROSS-REFERENCE TO RELATED APPLICATION

This application claims the benefit of priority to Korean Patent Application No. 10-2018-0122595, filed in the Korean Intellectual Property Office on Oct. 15, 2018, the entire contents of which are incorporated herein by reference.

TECHNICAL FIELD

The present disclosure relates to an apparatus and method for controlling a wiper of a vehicle.

BACKGROUND

In general, a vehicle is equipped with a wiper that removes foreign matter, snow, or rain from the surface of the windshield glass or the surface of the rear window glass.

The wiper of the vehicle wipes the glass with a wiper blade operated by a wiper motor and performs a function of securing a driver's view. The wiper of the vehicle has a structure in which rotary motion produced by the wiper motor is transmitted to a pivot mechanism and a wiper arm through a wiper link and the wiper arm is swung from side to side so that the wiper blade moves over the surface of the glass to remove foreign matter from the surface of the glass. The operation of the wiper motor is controlled by, for example, a body control module (BCM) in the vehicle.

SUMMARY

An aspect of the present disclosure provides a vehicle wiper control apparatus and method for monitoring whether warpage occurs in a wiper strip made of a rubber-elastic material that is provided in a wiper blade, when a wiper of a vehicle is turned off and controlling the wiper to move the wiper blade to a parking position, when the warpage occurs in the wiper strip, thereby preventing deformation of the wiper strip and maintaining the performance thereof.

According to an aspect of the present disclosure, an apparatus for controlling a wiper of a vehicle includes a wiper motor that operates a wiper blade of the vehicle, a detector that detects warpage of a wiper strip provided in the wiper blade, and a controller that drives the wiper motor for reference time, based on a detection result of the detector.

The controller may activate the detector when a wiper off signal is input.

The wiper strip may have a structure therein, in which a plurality of flexible printed circuit boards (FPCBs), each having conductive contacts at opposite ends thereof, are connected in a row through the contacts. The contacts of the FPCBs in the structure may be disconnected from each other by the warpage of the wiper strip.

The detector may be connected to a contact at one end of the first FPCB and a contact at an opposite end of the last FPCB and may detect the warpage of the wiper strip, based on voltage.

The apparatus may further include a storage that stores different reference time for each vehicle model.

According to another aspect of the present disclosure, a method for controlling a wiper of a vehicle includes detecting warpage of a wiper strip provided in a wiper blade of the vehicle and driving a wiper motor for reference time, based on the detection result.

The detecting of the warpage of the wiper strip may be performed when a wiper off signal is input.

The wiper strip may have a structure therein, in which a plurality of flexible printed circuit boards (FPCBs), each having conductive contacts at opposite ends thereof, are connected in a row through the contacts. The contacts of the FPCBs in the structure may be disconnected from each other by the warpage of the wiper strip.

The detector may be connected to a contact at one end of the first FPCB and a contact at an opposite end of the last FPCB and may detect the warpage of the wiper strip, based on voltage.

The method may further include storing different reference time for each vehicle model.

According to another aspect of the present disclosure, an apparatus for controlling a wiper of a vehicle includes a wiper motor that operates a wiper blade of the vehicle, a wiper strip having a structure therein, in which a plurality of flexible printed circuit boards (FPCBs), each having conductive contacts at opposite ends thereof, are connected in a row through the contacts, a detector that is connected to a contact at one end of the first FPCB and a contact at an opposite end of the last FPCB and that detects warpage of the wiper strip, based on voltage, when the contacts of the FPCBs are disconnected from each other, and a controller that drives the wiper motor for reference time when the warpage of the wiper strip is detected by the detector.

BRIEF DESCRIPTION OF THE DRAWINGS

The above and other aspects, features and advantages of the present disclosure will be more apparent from the following detailed description taken in conjunction with the accompanying drawings.

DETAILED DESCRIPTION

Figure 1:
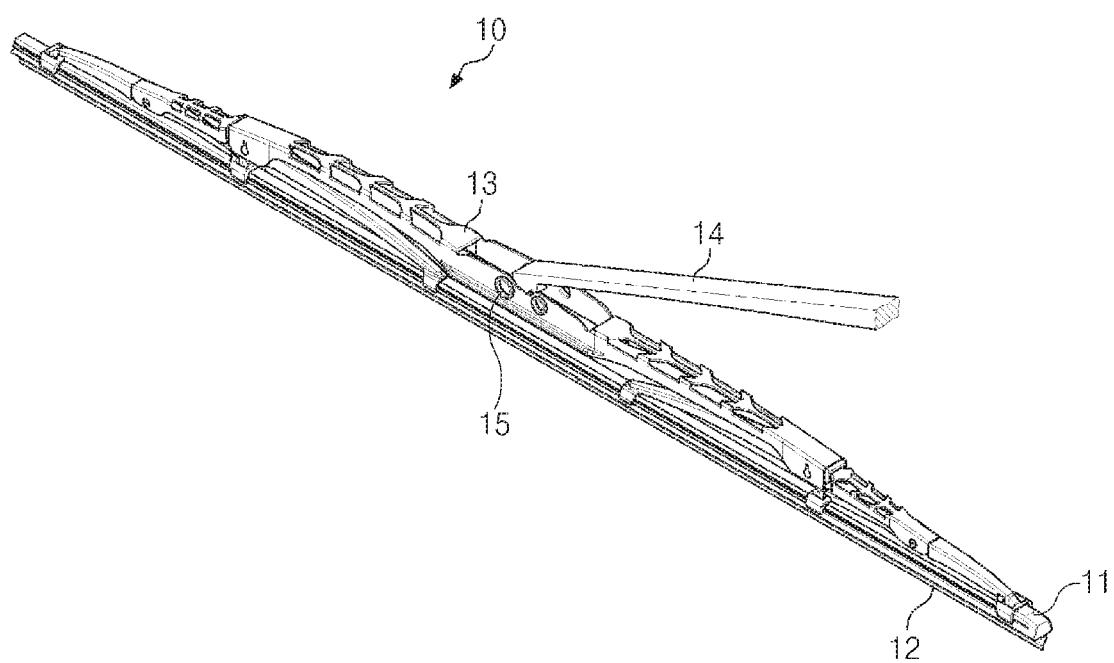
FIG. 1 is a view illustrating the structure of a wiper blade for a vehicle according to an embodiment of the present disclosure.

Hereinafter, embodiments of the present disclosure will be described in detail with reference to the accompanying drawings. It should be understood that even if shown in different drawings, identical components are provided with identical reference numerals in the drawings. Furthermore, in describing the embodiments of the present disclosure, detailed descriptions related to well-known functions or configurations will be omitted when they may make subject matters of the present disclosure unnecessarily obscure.

Terms, such as "first", "second", "A", "B", "(a)", "(b)", and the like, may be used herein to describe components of the present disclosure. Such terms are only used to distinguish one component from another component, and the substance, sequence, order, or number of these components is not limited by these terms. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Operating modes of the wiper include a LOW mode and a HIGH mode, and the wiper motor controlled by the BCM has a total of four terminals. Among the terminals of the wiper motor, an E terminal is a ground (−) terminal, a P terminal is a parking control terminal, an H terminal is a HIGH mode terminal, and an L terminal is a LOW mode terminal. Furthermore, the wiper motor has a cam plate and an internal contact formed by the P and E terminals that are connected or disconnected by the cam plate. The cam plate is installed to rotate integrally with a worm gear (a worm wheel) that is rotated inside the wiper motor by the torque of a motor, and connects the P terminal of the internal contact to the E terminal once according to the position of the wiper blade while making one revolution.

During one revolution of the cam plate, the wiper blade is swung once by the wiper motor to wipe the glass, after which the P terminal and the E terminal of the wiper motor are connected by the cam plate so that the wiper blade stops at a preset parking position. If a user does not turn off the wiper through a multi-function switch, the BCM does not turn off a low relay even though the P and E terminals of the wiper motor are connected. Accordingly, the cam plate is rotated by the inertia of the wiper motor, with the P terminal and the E terminal connected together. Due to this, the P terminal and the E terminal are disconnected from each other, and the wiper motor is driven again by the power of a battery to operate the wiper blade. The wiper blade consistently wipes the glass by repetition of the process.

Meanwhile, a jerking phenomenon may arise in which the wiper blade stops in the middle of the glass rather than at the parking position when the wiper of the vehicle is turned off by the user. The jerking phenomenon may be caused by warpage in a wiper strip made of a rubber-elastic material that is provided in the wiper blade. In one implementation of the wiper operation, a stiffener is applied to a wiper strip to prevent the wiper strip from being deformed when a jerking phenomenon occurs. However, a method for detecting and solving the jerking phenomenon has not been proposed.

In embodiments, a wiper apparatus of a vehicle includes a wiper blade, a wiper mechanism including a wiper motor, a warpage detection circuit and a controller. The wiper includes a wiper blade that includes a wiper strip. Serially connected flexible printed circuit boards (FPCBs) are included in the wiper strip. Each of the serially connected FPCBs has conductive contacts at opposite ends thereof. The serially connected FPCBs are arranged in a row and are electrically connected in series through the contacts. The wiper motor is connected to the wiper blade of the vehicle and is configured to move the wiper blade. The warpage detection circuit is connected to a contact at one end of the first FPCB and a contact at an end of the last FPCB and configured to detect electrical disconnection in the serially connected FPCBs. The controller is configured to determine if there is warpage in the wiper strip based on a signal from the warpage detection circuit and cause the wiper motor to operate for a predetermined time period such that the wiper blade moves to its parking position when the warpage of the wiper strip is detected by the warpage detection circuit.

FIG. 1 is a view illustrating the structure of a wiper blade for a vehicle according to an embodiment of the present disclosure.

As illustrated in FIG. 1, the wiper blade 10 according to the embodiment of the present disclosure has a vertically extending elastic support 11, and a vertically extending wiper strip 12 is secured to the bottom of the support 11 so as to be parallel to a longitudinal axis. For example, the wiper strip 12 may be formed of a rubber-elastic material. Furthermore, an elastic support member with elasticity may be combined with the wiper strip 12 to bring the wiper strip 12 into close contact with a glass surface.

A connecting apparatus 13 may be mounted on a central portion of an upper surface of the support 11 that is represented by a spring rail, and the wiper blade 10 may be removably combined with a drive wiper arm 14 by the connecting apparatus 13.

The wiper arm 14 has a hook formed at a distal end thereof, and the hook is secured to a coupler 15 of the wiper blade 10. The wiper arm 14 and the wiper blade 10 are secured to each other by a well-known fixing means such as an adaptor.

A structure for detecting warpage is inserted into the wiper strip 12. Hereinafter, the structure will be described in detail.

Figure 2:
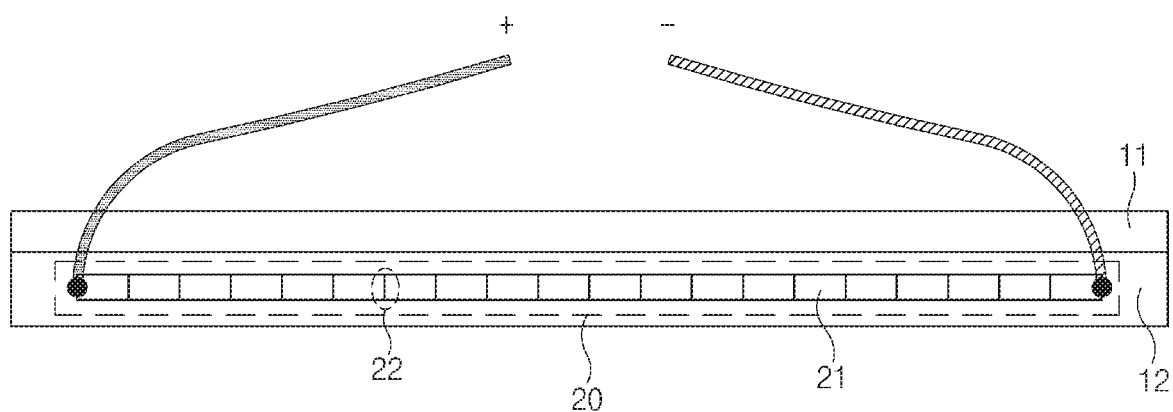
FIG. 2 is a structural view illustrating the internal structure of a wiper strip according to an embodiment of the present disclosure.

FIG. 2 is a structural view illustrating the internal structure of the wiper strip according to an embodiment of the present disclosure.

As illustrated in FIG. 2, a structure 20 for detecting warpage of the wiper strip 12 is inserted into the wiper strip 12 according to the embodiment of the present disclosure. The structure 20 includes a plurality of flexible printed circuit boards (FPCBs) 21, each having conductive contacts 22 at opposite ends thereof, which are connected together through the contacts 22. In this case, a contact at one end of an FPCB and a contact at an opposite end thereof are connected by a strip line. In embodiments, the FPCBs are embedded in the rubber of the wiper strip or attached to the rubber of the wiper strip.

Figure 3:
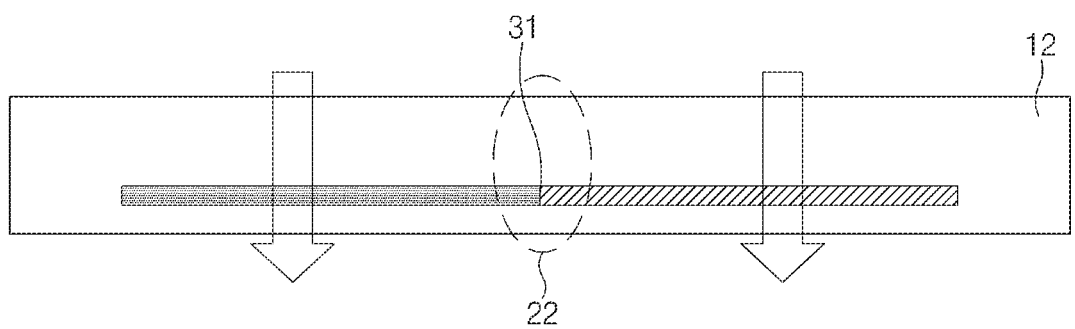
FIG. 3 is a detailed structural view illustrating the internal structure of the wiper strip according to the embodiment of the present disclosure.

In the case where warpage does not occur in the wiper strip 12, the plurality of FPCBs 21, which are arranged in a row inside the wiper strip 12 made of a rubber-elastic material, remain electrically connected through detailed contacts 31 as illustrated in FIG. 3.

Figure 4:
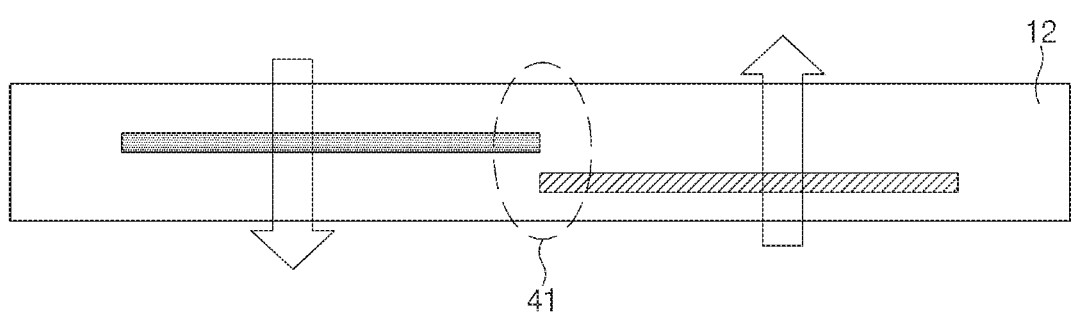
FIG. 4 is a view illustrating the internal state of the wiper strip when warpage occurs in the wiper strip according to the embodiment of the present disclosure.

However, in the case where warpage occurs in the wiper strip 12, the contacts of the FPCBs 21 are disconnected from and not electrically connected with each other as illustrated in by reference numeral 41 in FIG. 4.

Figure 5:
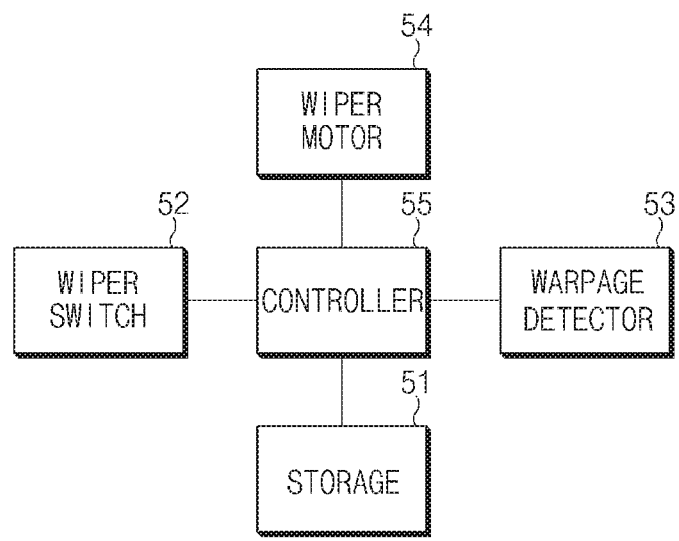
FIG. 5 is a block diagram illustrating an apparatus for controlling a wiper of a vehicle according to an embodiment of the present disclosure.

FIG. 5 is a block diagram illustrating an apparatus for controlling a wiper of a vehicle according to an embodiment of the present disclosure.

As illustrated in FIG. 5, the wiper control apparatus 50 according to the embodiment of the present disclosure may include storage 51, a wiper switch 52, a warpage detector 53, a wiper motor 54, and a controller 55. The components may be integrated according to manners of carrying out the wiper control apparatus 50 according to the embodiment of the present disclosure. In addition, some of the components may be omitted according to manners of carrying out the invention.

The storage 51 stores temporal information for driving the wiper motor 54 when warpage occurs in the wiper strip 12. Since the size of a windshield and the size of a wiper blade vary depending on vehicle models, the temporal information also varies depending on the vehicle models. For example, the operating time of the wiper may be 0.7 seconds.

The storage 51 may include at least one type of storage medium among memories of a flash memory type, a hard disk type, a micro type, and a card type (e.g., a secure digital (SD) card or an eXtream digital (XD) card) and memories of a random access memory (RAM) type, a static RAM (SRAM) type, a read-only memory (ROM) type, a programmable ROM (PROM) type, an electrically erasable PROM (EEPROM) type, a magnetic RAM (MRAM) type, a magnetic disk type, and an optical disk type.

The wiper switch 52 is a switch for turning on/off the wiper and is usually implemented in the form of a multi-function switch. The multi-function switch includes, as main components, an operating lever including a plurality of switches for operating or adjusting lamps and wipers of the vehicle and a washer-fluid spray function and a body on which the operating lever is seated, the body being fastened to a steering column.

The operating lever includes a left lever having a switch function mainly related to lighting and a right lever having a switch function mainly related to wiping. The left lever and the right lever include a pivoting lever pivotally coupled to the body and a rotary knob rotatably coupled to the pivoting lever. The pivoting lever is an operation part that a user operates by pivoting it about a portion where it is hinged to the body, and the rotary knob is an operation part that the user operates by rotating it on the lever with the user's fingers.

A plurality of rotary knobs may be mounted on the pivoting lever to provide various switch functions. The plurality of rotary knobs may be rotatably mounted on a side surface and an end portion of the pivoting lever. The body includes a plurality of movable contacts and stationary contacts connected with the switches included in the operating lever and a connector for transmitting a signal generated by operating the operating lever to a corresponding part of the vehicle.

The left lever is configured to turn on/off head lamps (a high beam/a low beam), turn signal lamps, tail lamps, or fog lamps and select an auto mode (provided in a vehicle to which an auto light system is applied) by operating the pivoting lever or operating the rotary knob.

The rotary knob of the left lever includes an intermediate knob rotated on a side surface of the pivoting lever and an end knob coupled to a tip end portion of the pivoting lever. The end knob may be rotated to turn on/off the head lamps (the high beam/the low beam) or adjust the aiming direction of the head lamps and select the auto mode ("AUTO") of the auto light system. The intermediate knob may be rotated to turn on/off the fog lamps (front fog lamps/rear fog lamps).

The right lever is configured to turn on/off the wiper, adjust the speed of the wiper, or perform a washer-fluid spray function by operating the pivoting lever or operating the rotary knob. The rotary knob of the right lever also includes an intermediate knob rotated on a side surface of the pivoting lever and an end knob coupled to a tip end portion of the pivoting lever. The end knob provides a switch function for operating functions of a rear wiper and a rear washer-fluid spray apparatus for the rear window glass of the vehicle, and the pivoting lever and the intermediate knob provide a switch function for operating functions of a front wiper and a front washer-fluid spray apparatus for the front window glass (the windshield) of the vehicle.

The front and rear washer-fluid spray apparatuses may be operated by operating the pivoting lever of the right lever back and forth, and the front wiper may be operated in an OFF, high-speed (HI), low-speed (LO), or automatic (AUTO) mode by operating the pivoting lever up and down. The speed of the front wiper may be adjusted by rotating the intermediate knob, and the rear wiper may be operated in an ON, OFF, or intermittent (INT) mode by rotating the end knob.

The warpage detector 53 detects warpage of the wiper strip 12 provided in the wiper blade 10. In embodiments, the warpage detector 53 is connected to a plus terminal and a minus terminal as illustrated in FIG. 4 to detect a state in which the contacts of the FPCBs 21 are electrically disconnected from each other by warpage of the wiper strip 12. In one embodiment, a circuit is provided for the warpage detector.

According to another embodiment, when the contacts of the FPCBs 21 are disconnected from each other by warpage of the wiper strip 12, the warpage detector 53 may detect the warpage of the wiper strip 12, based on applied voltage (e.g., 12 V), with the minus terminal connected to the ground and the warpage detector 53 connected to the plus terminal.

For example, when warpage occurs in the wiper strip 12 while a voltage of 12 V is being applied, the contacts of the FPCBs 21 are electrically disconnected from each other, and 12 V is detected. In contrast, when warpage does not occur in the wiper strip 12, 0 V is detected.

The wiper motor 54 is a module that moves the wiper blade 10 over the windshield. The wiper motor 54 operates under the control of the controller 55.

The controller 55 performs overall control to enable the components to perform functions thereof normally. The controller 55 may be implemented in a hardware or software form, or may be implemented in a form in which hardware and software are combined. In embodiments, the controller 55 may be implemented with, but is not limited to, a microprocessor.

When an off signal is input from the wiper switch 52, the controller 55 stops an operation of the wiper. At this time, the controller 55 activates the warpage detector 53 to cause the warpage detector to perform detection of warpage.

When warpage is detected by the warpage detector 53, the controller 55 operates the wiper motor 54, based on the temporal information stored in the storage 51. The wiper blade 10 is moved to a parking position by the operation of the controller 55, and the warpage of the wiper strip 12 is removed.

Figure 6:
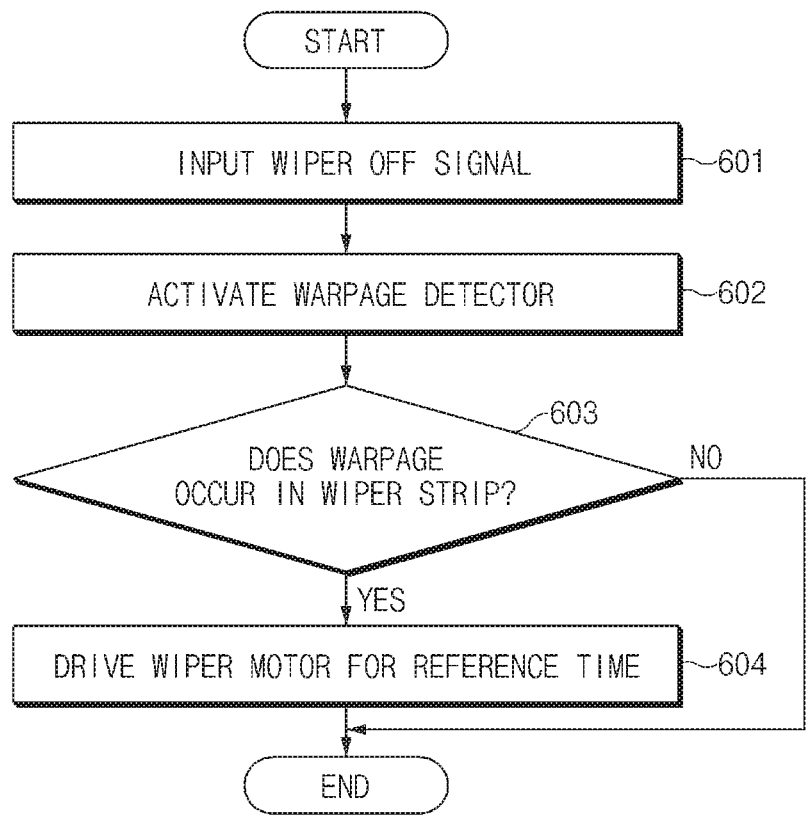
FIG. 6 is a flowchart illustrating a method for controlling a wiper of a vehicle according to an embodiment of the present disclosure.

FIG. 6 is a flowchart illustrating a method for controlling a wiper of a vehicle according to an embodiment of the present disclosure, where FIG. 6 illustrates a process performed by the controller 55.

First, when a wiper off signal is input through the wiper switch 52 (Step 601), the controller 55 activates the warpage detector 53 (Step 602).

Next, when the warpage detector 53 detects warpage of the wiper strip 12 (Step 603), the controller 55 drives the wiper motor 54 for reference time (Step 604).

When the wiper motor 54 is driven in this way, the wiper blade 10 is moved to the parking position. In the parking position, warpage of the wiper strip 12 does not occur.

According to the embodiments of the present disclosure, the vehicle wiper control apparatus and method may monitor whether warpage occurs in the wiper strip made of a rubber-elastic material that is provided in the wiper blade, when the wiper of the vehicle is turned off and may control the wiper to move the wiper blade to the parking position, when the warpage occurs in the wiper strip, thereby preventing deformation of the wiper strip and maintaining the performance thereof.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for use with a vehicle, the apparatus comprising:
   a wiper motor connected to a wiper blade of the vehicle and configured to move the wiper blade;
   a detector configured to detect warpage of a wiper strip provided in the wiper blade; and
   a controller configured to drive the wiper motor for a reference time, based on a detection result of the detector.

2. The apparatus of claim 1, wherein the controller is configured to activate the detector when a wiper off signal is input.

3. The apparatus of claim 1, wherein the wiper strip comprises a plurality of flexible printed circuit boards (FPCBs), each having conductive contacts at opposite ends thereof, wherein the FPCBs are arranged and connected in a row through the contacts.

4. The apparatus of claim 3, wherein the contacts of the FPCBs in the structure are configured to be disconnected from each other by the warpage of the wiper strip.

5. The apparatus of claim 3, wherein the detector is connected to a contact at one end of a first FPCB and a contact at an opposite end of a last FPCB and is configured to detect the warpage of the wiper strip, based on voltage.

6. The apparatus of claim 1, further comprising a storage configured to store different reference times for different vehicle models.

7. A method of operating the apparatus of claim 1, the method comprising:
   using the detector to detect warpage of the wiper strip; and
   driving the wiper motor for the reference time based on the detection result.

8. The method of claim 7, wherein the warpage of the wiper strip is detected when a wiper off signal is input.

9. The method of claim 7, wherein the wiper strip comprises a plurality of flexible printed circuit boards (FPCBs), each having conductive contacts at opposite ends thereof, wherein the FPCBs are arranged and connected in a row through the contacts.

10. The method of claim 9, wherein using the detector to detect the warpage comprises detecting if the contacts of the FPCBs in the wiper strip are disconnected from each other by the warpage of the wiper strip.

11. The method of claim 9, wherein the detector is connected to a contact at one end of a first FPCB and a contact at an opposite end of a last FPCB and detects the warpage of the wiper strip, based on voltage.

12. The method of claim 7, wherein the reference time has a length predetermined for each vehicle model.

13. A wiper apparatus of a vehicle, comprising:
   a wiper blade comprising a wiper strip which comprises a plurality of flexible printed circuit boards (FPCBs), each having conductive contacts at opposite ends thereof, wherein the FPCBs are connected in a row through the contacts;
   a wiper motor connected to the wiper blade of the vehicle and configured to move the wiper blade;
   a detector connected to a contact at one end of a first FPCB and a contact at an opposite end of a last FPCB and configured to detect warpage of the wiper strip, based on voltage, when any one of the contacts of the FPCBs is disconnected from a corresponding one of the contacts; and
   a controller configured to drive the wiper motor for a reference time when the warpage of the wiper strip is detected by the detector.

14. The apparatus of claim 13, wherein the controller is configured to activate the detector when a wiper off signal is input.

15. The apparatus of claim 13, further comprising a storage configured to store different reference times for different vehicle models.

16. A method of operating the apparatus of claim 13, the method comprising:
   using the detector to detect warpage of the wiper strip; and
   driving the wiper motor for the reference time based on the detection result.

17. The method of claim 16, wherein the warpage of the wiper strip is detected when a wiper off signal is input.

18. The method of claim 16, wherein the reference time has a length predetermined for each vehicle model.

19. An apparatus for use with a vehicle, the apparatus comprising:
   a wiper motor connected to a wiper blade of the vehicle and configured to move the wiper blade;
   a detector configured to detect warpage of a wiper strip provided in the wiper blade;
   a storage configured to store different reference times for different vehicle models; and
   a controller configured to drive the wiper motor for a reference time of the different reference times based on a detection result of the detector, wherein the controller is configured to activate the detector when a wiper off signal is input.

20. The apparatus of claim 19, wherein the wiper strip comprises a plurality of flexible printed circuit boards (FPCBs), each having conductive contacts at opposite ends thereof, wherein the FPCBs are arranged and connected in a row through the contacts.

\* \* \* \* \*